April 12, 1966 W. H. DAVIDOW 3,246,294

BINARY COMPARATOR CIRCUIT UTILIZING INTERROGATION

Filed Feb. 28, 1963

INVENTOR.
WILLIAM H. DAVIDOW
BY
Samuel E. Turner
ATTORNEY 3,246,294

BINARY COMPARATOR CIRCUIT UTILIZING INTERROGATION

William H. Davidow, Stanford, Calif., assignor to General Electric Company, a corporation of New York Filed Feb. 28, 1963, Ser. No. 261,701
7 Claims. (Cl. 340—146.2)

Figure 1:
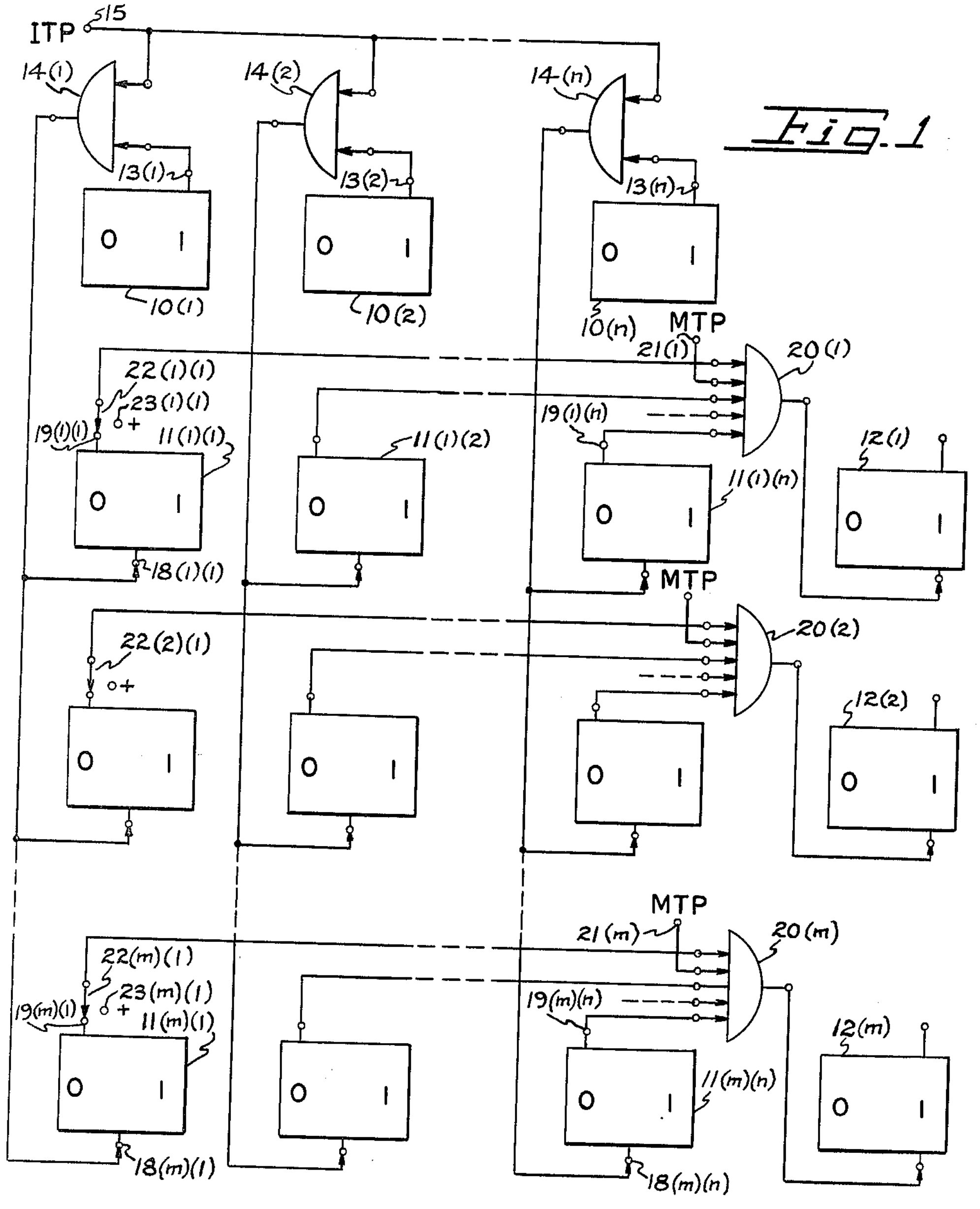

This invention relates to interrogation circuits and more particularly to a circuit for indicating that one or more stored data words matches an interrogation word.

There are many instances in the data-processing field where it is necessary to compare a word with one or more other words or portions thereof. For example, for certain data-processing purposes it is desirable to provide a memory system wherein data records are located and retrieved on the basis of content rather than address or location as in conventional memory systems. In such memory systems, often designated as "associative" or "data-addressed" memory systems, each stored record may include a record identification portion or word.

To locate the desired data records, the memory is interrogated with an interrogation word corresponding to the record identification portion or word of the desired records. In response to the interrogation, an indication of the location of each record which contains an identification word that matches the interrogation word is provided whereby the desired records may be selected and retrieved.

To accomplish the interrogation, a single comparison circuit could be provided in an arrangement for comparing in succession each identification word with the interrogation word. However, to reduce searching time it is desirable to interrogate all of the stored words substantially simultaneously.

Simultaneous interrogation could be accomplished by providing a separate comparison circuit for each stored word. However, this requires a large amount of logic circuitry and is not economical. As is well appreciated, the reduction of the amount of circuitry and circuit elements in computer devices is an important consideration.

It is therefore an object of the invention to provide a simplified interrogation circuit.

It is another object of the invention to provide a simplified circuit for indicating the data words in a memory that match an interrogation word.

It is another object of the invention to interrogate a plurality of words substantially simultaneously with a minimum of circuitry.

These and other objects are achieved according to the invention by first detecting the binary value of each bit of the interrogation word. Then, in each bit position wherein the interrogation bit is of a predetermined one of the two binary values the corresponding bit of each stored word which is to be interrogated is complemented or inverted. The result is that the bits of each interrogated word that matches the interrogation word now have the same binary value. This identity in value of all the bits of the modified matching words can be detected to provide an indication of the location of the matching words. After the locations of the matching words have been marked, the inverting process is repeated to restore the interrogated words to their original values.

The principle of operation of the invention is further illustrated by the following examples: Assume that the interrogation word is "101." Assume further that the memory contains a matching stored word "101" as a word to be interrogated. If the selected previously mentioned predetermined value of the interrogation bits is "1," then the rule of operation is as follows: If there is a "1" in a bit position of the interrogation word, the corresponding bit of the stored word is complemented or inverted. In the present example, the first and last bit positions of the interrogation word "101" contain "1's." Thus the first and last bits of the stored word are inverted and the resulting modified stored word is "000." This condition of all "0's" is detected to mark the matching stored word and then the inverting process is repeated to restore the stored word to its original value.

In the case of an interrogated stored word that does not match the interrogation word, the stored word, as modified according to the above rule, contains one or more "1's." Thus, for example, if the first and last bits of a stored word "100" are inverted, the modified stored word is "001" and the location of the word is not marked.

The same result is obtained if the value "0" is selected as the above-mentioned predetermined value of the interrogation bits. In this case the complementary form of the above-stated rule of operation applies; namely, if there is a "0" in a bit position of the interrogation word, the corresponding bit of the stored word is complemented or inverted. In this case, each bit position of a modified matching word contains a "1" while non-matching modified words contain one or more "0's."

Figure 2:
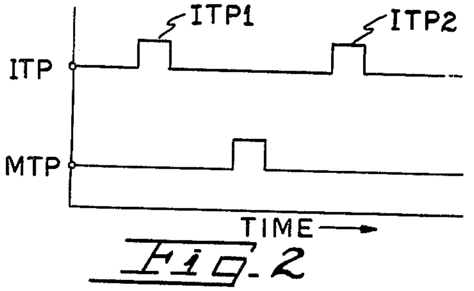

The structure, organization and operation of the invention is described more specifically in the following detailed description with reference to the accompanying drawings in which:

FIGURE 1 is a schematic illustration of the interrogation system of the invention; and FIGURE 2 is a diagram of timing pulses applied to the system of FIG. 1.

The circuit of the invention, as shown in FIG. 1, includes a plurality of bit storage elements arranged in rows and columns for convenience of illustration. A row of interrogation storage elements 10(1)–10($n$) is provided for receiving the interrogation word. A plurality of bit storage elements 11(1)(1)–11($m$)($n$) are arranged in $m$ rows and $n$ columns and constitute the memory for receiving stored words to be interrogated, the 1st, 2nd and $m$th rows and the 1st, 2nd and $n$th columns being illustrated.

It is assumed that each row of the memory storage elements, such as the storage elements 11(1)(1)–11(1)($n$) of the first row, contains one of the stored words to be interrogated. As mentioned hereinbefore, each word to be interrogated may comprise a part of a larger stored record, other parts of which may be stored in associated storage elements, not shown. Thus in the following description the term "stored word" refers to a word to be interrogated which is stored in one of the illustrated $m$ rows of memory storage elements.

Also shown in FIG. 1 is a plurality of match-indicating or location marker storage elements 12(1)–12($m$). Each one of the match-indicating storage elements is associated with a respective row of memory storage elements and is adapted to store an indication that the stored word of the row matches the interrogation word.

Each of the above-defined storage elements may be any well-known storage circuit which has two information representing states to represent the binary digits "0" and "1." (For example, the storage elements may be well-known flip-flops such as shown, for example, by Abraham I. Pressman in Chapter 11 of "Design of Transistorized Circuits for Digital Computers," John F. Rider Publisher, Inc., New York, 1959.) Thus each storage element has a binary "0" representing state and a binary "1" representing state hereinafter referred to as a "0" state and a "1" state.

Each of the interrogation bit storage elements 10(1)–10($n$) is provided with a respective output terminal 13(1)–13($n$). Each of these output terminals is connected to an input terminal of a respective one of a plurality of interrogation AND gates 14(1)–14(n). (The well-known AND gate is a circuit which provides an output signal only when enabling signals are applied simultaneously to each of its input terminals.)

It is arranged that an enabling signal appears on any one of the output terminals 13(1)–13(n) only when the corresponding storage element is in its "1" state. For example, an enabling signal is present on the output terminal 13(1) when storage element 10(1) is in the "1" state; however, when storage element 10(1) is in the "0" state the enabling signal is absent from terminal 13(1).

For the purpose of timing the interrogation operation, interrogation timing pulses ITP are applied to a terminal 15. Terminal 15 is connected to an input terminal of each one of the AND gates 14(1)–14(n), the timing pulses thus constituting enabling signals for these terminals of the gates.

Each of the memory bit storage elements 11(1)(1)–11(m)(n) is provided with a respective input terminal 18(1)(1)–18(m)(n). The storage elements 11(1)(1)–11(m)(n) are adapted to operate as binary counters, that is, a triggering signal applied to one of the input terminals 18(1)(1)–18(m)(n) reverses the state of the corresponding memory storage element. For example, if the storage element 11(1)(1) is in the "1" state, a triggering signal applied to the terminal 18(1)(1) causes this storage element to assume the "0" state and vice versa. The input terminals of the memory storage elements in each column are connected to the output terminal of the interrogation AND gate of the column, the output signal of the AND gate thus constituting the triggering signal for the memory storage elements. For example, the output terminal of the AND gate 14(1) is connected to the input terminals of memory storage elements 11(1)(1)–11(m)(1).

Each of the memory storage elements 11(1)(1)–11(m)(n) is further provided with a respective output terminal 19(1)(1)–19(m)(n). In the illustrated embodiment, these output terminals are connected to the "0" side of the memory storage elements. Each memory storage element is adapted to provide an enabling signal on its output terminal when the memory element is in the "0" state. For example, when the storage element 11(1)(1) is in the "0" state an enabling signal is present on output terminal 19(1)(1); however, when the storage element is in the "1" state the enabling signal is absent from terminal 19(1)(1).

Each of the output terminals of the memory storage elements of each row is connected to a respective input terminal of a respective one of a plurality of match-indicating AND gates 20(1)–20(m). For example, each output terminal 19(1)(1)–19(1)(n) of the first row of memory storage elements is connected to a respective input terminal of the AND gate 20(1). (The short dashed line connected to one of the input terminals of gate 20(1) represents a plurality of connections from a respective plurality of output terminals of the storage elements 11(1)(3)–11(1)(n–1), not shown, to a respective plurality of input terminals of the gate 20(1).)

The purpose of the match-indicating AND gates 20(1)–20(m) is to detect and signal the occurrence of the same state of all the memory storage elements of a row. To time the detection or match-indicating operation, a match timing pulse MTP is applied to a plurality of terminals 21(1)–21(m) each of which is connected to an input terminal of a respective one of the AND gates 20(1)–20(m). For example, if each of the memory storage elements 11(1)(1)–11(1)(m) of the first row is in the "0" state, the AND gate 20(1) is enabled to produce a signal on its output terminal upon the occurrence of the match timing pulse MTP.

The output signals from AND gates 20(1)–20(m) may be used directly as the match-indicating output signals of the system, or they may be used, as illustrated in FIG. 1, as triggering input signals to the match-indicating or location marker storage elements 12(1)–12(m) whereby the match information is stored. The match-indicating output signals of the system, whether taken from gates 20(1)–20(m) or from storage elements 12(1)–12(m), may be used to enable circuits, not shown, for read-out of the stored records associated with the matching interrogated words.

The illustrated embodiment of the invention is connected to operate according to the rule of operation previously set forth. The operation of the circuit may thus be stated in general terms as follows: If the interrogation storage element of a column is in the "1" state, a first triggering signal is produced to reverse the state of each memory storage element of the column. The states of the memory storage elements in each row are then sensed and a match-indicating signal is produced in each row in which all of the storage elements are in the "0" state. A second triggering signal is produced to restore the previously reversed memory storage elements to their original states.

Operation of the system is illustrated by the following example, reference being made to FIG. 2 for the time relationship of the timing signals.

The following three digit binary words are assumed to have been entered, by means not shown, into the illustrated interrogation and memory storage elements of the system:

| | |
|---|---|
| Interrogation row | "110" |
| 1st memory row | "100" |
| 2nd memory row | "010" |
| mth memory row | "110" |

Thus in the row of interrogation storage elements, the storage element 10(1) is in the "1" state, storage element 10(2) is in the "1" state and storage element 10(n) is in the "0" state to represent the interrogation word "110." Similarly, each of the memory storage elements 11(1)(1)–11(m)(n) is in a state to represent the respective digit or bit of the respective word stored in the row.

Operation of the system is timed and controlled by the timing pulses shown in FIG. 2. A timing signal ITP1 is applied to the terminal 15. Because the storage element 10(1) is in its "1" state, an enabling signal is present on the output terminal 13(1). The gate 14(1) is therefore enabled and in response to the timing pulse ITP1 the gate 14(1) transmits a triggering signal to the input terminals 18(1)(1)–18(m)(1) of the memory storage elements of the first column. In response to this triggering signal the memory storage elements 11(1)(1)–11(m)(1) change their states.

Similarly, the interrogation storage element 10(2) is in the "1" state to represent the second bit or digit of the interrogation word, and a triggering signal is transmitted by gate 14(2) for reversing the states of the memory storage elements of the second column.

However, the storage element 10(n) is in the "0" state to represent the third bit of the interrogation word, and thus the gate 14(n) is not enabled. Therefore, the gate 14(n) does not transmit a triggering signal and the memory storage elements 11(1)(n)–11(m)(n) of the nth column remain in their initial states. At the conclusion of the above action, the stored words stand modified as follows:

| | |
|---|---|
| 1st memory row | 010 |
| 2nd memory row | 100 |
| mth memory row | 000 |

Thus only the mth row contains a word that matches the interrogation word is indicated by the "0" state of each of the memory storage elements of the mth row. When the timing signal MTP is now applied to terminals 21(1)–21(m), the gate 20(m) is enabled and it transmits a triggering signal to an input terminal of match-indicating storage element 12(m).

Assuming that the match-indicating storage elements 12(1)–12(m) are initially in the "0" state, the triggering signal from gate 20($m$) causes storage element 12($m$) change to the "1" state to thereby indicate or mark the location of the matching stored word. (The gates 20(1) and 20(2) do not produce a triggering signal in this example because one or more of the memory storage elements of the corresponding rows are in the "1" state and therefore these gates are not enabled.)

A cycle of operation is completed by applying a timing pulse ITP2 to terminal 15. This results in a second reversing operation whereby the memory storage elements which previously changed state in response to the timing pulse ITP1 are again reversed. In this way the memory words are restored to their initial form or value.

It is noted that the circuit of FIG. 1 can readily be arranged to operate according to the complementary form of the rule of operation mentioned hereinbefore. To accomplish this, each output terminal 13(1)–13($n$) is connected to the "0" side of its respective interrogation storage element instead of to the "1" side as shown in FIG. 1; and each output terminal 19(1)(1)–19($m$)($n$) is connected to the "1" side of its respective memory storage element instead of to the "0" side as shown in FIG. 1. With these modifications, an interrogation AND gate transmits a triggering signal in response to a timing pulse applied to terminal 15 when the interrogation storage element of the column is in the "0" state; and a match-indicating AND gate transmits an output signal in response to the timing pulse MTP when each of the memory storage elements of the row is in the "1" state.

For certain data-processing operations it is desirable to interrogate only selected ones of the bit positions or columns of the memory storage elements. This is a useful feature where the stored words contain several different items of information and it is desired to retrieve all words that contain a specific one of the items. This selective interrogation may be accomplished by disabling the match-indicating circuit in the unselected columns or bit positions.

For simplicity of illustration the disabling structure is shown in only the first column of FIG. 1, it being understood that such structure can be provided in each of the columns. In the first column the disabling structure includes a plurality of switches 22(1)(1)–22($m$)(1), each of which is normally closed to complete the connection from a respective one of the output terminals 19(1)(1)–19($m$)(1) to the respective input terminal of the match-indicating AND gate of the row.

To disable the interrogation of the first column, the switches 22(1)(1)–22($m$)(1) are each switched to a respective one of a plurality of terminals 23(1)(1)–23($m$)(1) to which a constant enabling signal is supplied. By this means a constant enabling signal is applied to the corresponding input terminals of the match-indicating AND gates 20(1)–20($m$) and the states of the memory storage elements of the first column therefore do not affect the detection by the gates 20(1)–20($m$) for the matching words. For example, with the interrogation of the first column thus disabled, the word in the second row in the example described hereinbefore would be detected as a matching word.

Another modification of the illustrated embodiment of the invention is to replace the match-indicating AND gates 20(1)–20($m$) with OR gates having input terminals connected to the "1" side of the memory storage elements such that each OR gate produces an output signal except the OR gate in a row containing a matching word.

While the principles of the invention have been made clear in the illustrative embodiment, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. In a data-addressed memory system, the combination of: a plurality of storage elements arranged in rows and columns, each row of storage elements containing a stored word, each storage element having two value representing states; means for representing an interrogation bit in each of selected columns; means in each column responsive to a predetermined value of the corresponding interrogation bit for substantially simultaneously changing the value representing state of each storage element of the column; and means in each row operable to produce an indication that the storage elements of the row that correspond to said selected columns are in a predetermined similar value representing state.

2. In a data-addressed memory system, the combination of: a plurality of bit storage elements including, a plurality of data bits storage elements arranged in rows and columns, an interrogation bit storage element in each column, a match-indicating bit storage element in each row, each of said bit storage elements having first and second value representing states, each data bit storage element having an input terminal and being operable in response to a signal applied thereto to reverse its value representing state, each data bit storage element having an output terminal and being operable to produce an enabling signal on its output terminal when said data bit storage element is in its first value representing state, each interrogation bit storage element having an output terminal and being operable to produce an enabling signal on its output terminal when said interrogation bit storage element is in its second value representing state, each match-indicating bit storage element having an input terminal and being responsive to a signal applied thereto to assume its second value representing state; an interrogation AND gate in each column; a connection from said output terminal of each interrogation bit storage element to the respective interrogation AND gate, said AND gate being enabled in response to said enabling signal on said output terminal of said interrogation bit storage element; a connection from the interrogation AND gate of a column to the input terminal of each data bit storage element of the column; means for applying a first interrogation timing signal to the interrogation AND gates whereby each enabled interrogation AND gate produces a signal for reversing the state of each date bit storage element of the corrsponding column; a match-indicating AND gate in each row; a connection from the output terminal of each data bit storage element of a row to the match-indicating AND gate of the row whereby said match-indicating AND gate is enabled when each data bit storage element of the row is in its first value representing state; a connection from each match-indicating AND gate to said input terminal of the match-indicating bit storage element of the corresponding row; means for applying a match timing signal to each of said match-indicating AND gates whereby each enabled match-indicating AND gate produces a signal for setting the corresponding match-indicating bit storage element to its second value representing state; and means for applying a second interrogation timing signal to said interrogation AND gates whereby the data bit storage elements which were reversed in response to said first interrogation timing signal are returned to their original states.

3. A system for comparing a first binary word with at least a second binary word, comprising: representing means for representing the value of each bit of said first word; a plurality of storage elements, each storage element having two states and each storage element being in a state to represent the value of a respective bit of said second word; means for receiving timing signals; means operable in response to a first timing signal and controlled by said representing means for reversing the value representing state of each storage element in each bit position wherein the corresponding bit of said first word has a predetermined value; means connected to said storage elements for indicating the occurrence of a predetermined similar value representing state of each of said storage elements; and means operable in response to a second timing signal for again reversing each previously reversed storage element.

4. In a data-addressed memory system, a circuit for indicating which of a plurality of data bits matches an interrogation bit, comprising: a plurality of storage elements, each storage element having two value representing states and each storage element initially being in a state to represent a respective one of said data bits; means for representing the value of said interrogation bit; means responsive to a predetermined value of said interrogation bit for substantially simultaneously reversing the value representing state of each storage element; means connected to each storage element for indicating a predetermined value representing state thereof; and means subsequently operable to return each storage element to its initial value representing state.

5. A system for indicating the location of each of a plurality of stored words that matches an interrogation word, comprising: means for representing the value of each bit of each stored word; means for indicating the value of each bit of said interrogation word; means responsive to an indication of a predetermined value of a bit of said interrogation word for substantially simultaneously changing the value of the bits in the corresponding bit position of said stored words whereby said stored words are modified; and means for indicating each modified stored word that has a predetermined value.

6. A system for indicating the location of each of a plurality of stored words that matches an interrogation word, comprising: means for representing the value of each bit of each stored word; means for indicating the value of each bit of said interrogation word; means responsive to an indication of a predetermined value of a bit of said interrogation word for substantially simultaneously changing the value of the bits in the corresponding bit position of said stored words whereby said stored words are modified; means for marking the location of each modified stored word that has a predetermined value; and means subsequently operable to restore the modified stored words to their unmodified values.

7. A system for indicating the location of each of a plurality of stored words that matches an interrogation word, comprising: means for representing the value of each bit of each stored word; means for indicating the value of each bit of said interrogation word; means responsive to an indication of a predetermined value of a bit of said interrogation word for substantially simultaneously changing the value of the bits in the corresponding bit position of said stored words whereby said stored words are modified; means for marking the location of each modified stored word that has a predetermined value; and means responsive to said indication of a predetermined value of a bit of said interrogation word for again changing the value of the bits in the corresponding bit position of said stored words whereby the modified stored words are restored to their unmodified values.

References Cited by the Examiner

UNITED STATES PATENTS 3,167,740 1/1965 King, et al. ------- 340—146.2

ROBERT C. BAILEY, *Primary Examiner.*

M. LISS, *Assistant Examiner.*